US012752546B2

(12) United States Patent
Morello

(10) Patent No.: US 12,752,546 B2
(45) Date of Patent: Oct. 6, 2026

(54) BUBBLE STOPPER OBJECT FOR AN INK-JET PRINT HEAD

(71) Applicant: SICPA HOLDING SA, Prilly (CH)

(72) Inventor: Giovanni Morello, Baldissero Canavese (IT)

(73) Assignee: SICPA HOLDING SA, Prilly (CH)

( * ) Notice: Subject to any disclaimer, the term of this patent is extended or adjusted under 35 U.S.C. 154(b) by 166 days.

(21) Appl. No.: 18/694,797

(22) PCT Filed: Sep. 22, 2022

(86) PCT No.: PCT/EP2022/076441
§ 371 (c)(1),
(2) Date: Mar. 22, 2024

(87) PCT Pub. No.: WO2023/046864
PCT Pub. Date: Mar. 30, 2023

(65) Prior Publication Data

US 2025/0115054 A1 Apr. 10, 2025

(30) Foreign Application Priority Data

Sep. 22, 2021 (EP) .................................... 21198380

(51) Int. Cl.
*B41J 2/19* (2006.01)
*B41J 2/175* (2006.01)

(52) U.S. Cl.
CPC ............. *B41J 2/19* (2013.01); *B41J 2/17503* (2013.01); *B41J 2/17563* (2013.01); *B41J 2202/07* (2013.01)

(58) Field of Classification Search
CPC ...... B41J 2/19; B41J 2/17503; B41J 2/17563; B41J 2202/07
See application file for complete search history.

(56) References Cited

U.S. PATENT DOCUMENTS 5,537,136 A 7/1996 Brandon et al.
7,273,275 B2 * 9/2007 Buchanan ............ B41J 2/17513 347/92

(Continued)

FOREIGN PATENT DOCUMENTS

CN 111284137 A 6/2020
EP 1097816 5/2001

(Continued)

OTHER PUBLICATIONS

International Search Report and Written Opinion issued with respect to application No. PCT/EP2022/076441.

(Continued)

*Primary Examiner* — Geoffrey S Mruk
(74) *Attorney, Agent, or Firm* — MUNCY, GEISSLER, OLDS & LOWE, P.C.

(57) ABSTRACT

The present technology relates to the field of ink-jet printing. The present technology provides a print head including a filter disposed between an ink reservoir and a standpipe, the filter being configured to filter out unwanted substances before ink from the ink reservoir enters the standpipe; and the standpipe configured to receive ink from the ink reservoir through the filter; the standpipe comprises an object disposed therein configured to impede gas bubble growth by directing a flow of the received ink incident on the object through one or more passages in the object.

11 Claims, 5 Drawing Sheets

(56) References Cited

U.S. PATENT DOCUMENTS

| | | | |
|---|---|---|---|
| 9,415,594 | B1 | 8/2016 | Stephens |
| 2004/0080592 | A1 | 4/2004 | Kneezel |
| 2011/0090294 | A1 | 4/2011 | Smith et al. |

FOREIGN PATENT DOCUMENTS

| | | | |
|---|---|---|---|
| EP | 3383661 | | 10/2018 |
| JP | H7164640 | A | 6/1995 |
| JP | H9277552 | A | 10/1997 |
| JP | H10166608 | A | 6/1998 |
| JP | H10296990 | A | 11/1998 |
| TW | 200918336 | A | 5/2009 |
| WO | 2017055058 | | 4/2017 |

OTHER PUBLICATIONS

International Preliminary Report on Patentability issued with respect to application No. PCT/EP2022/076441.

Chinese Office Action in counterpart Chinese Patent Application No. 202280063165.6 dated Mar. 27, 2026 (and English language translation of Office Action).

* cited by examiner

BUBBLE STOPPER OBJECT FOR AN INK-JET PRINT HEAD

FIELD OF THE INVENTION

The present invention relates to the field of ink-jet print head technology, in particular, relates to a thermal ink-jet print head.

BACKGROUND OF THE INVENTION

Thermal ink-jet print heads are used in ink-jet printers to print ink based on electrical activation of the print head. When the print head is electrically activated, a layer of ink is vaporized into a high-pressure vapor bubble. The high-pressure vapor bubble further keeps expanding and the continuous expansion causes a rapid motion of the surrounding ink. This causes a subsequent ejection of an ink droplet from a nozzle of the print head.

A challenge associated with the conventional ink-jet print heads is that external atmospheric gases such as Nitrogen and Oxygen tend to enter certain permeable sections in a body of the print head and dissolve into the ink. Once the ink is ejected, only a part of the dissolved gas may be released but the dissolved gas may not be completely released from the print head. The remaining dissolved gas in the print head may consequently form gas bubbles within the print head, which may clog the ink flow either partially or completely. This further causes clogging of the print head, which can eventually stop printing even before a natural life of the print head ends.

Therefore, there is a need to overcome the above challenges and propose a solution that prevents clogging of the print head.

SUMMARY OF THE INVENTION

In order to solve the above technical problems, the present invention provides a print head that includes an object to reduce or prevent clogging of the print head. According to the embodiments presented herein, the object may be an insert for reducing or preventing clogging in the print head by impeding bubble formation or growth, as will be described in more detail later.

Specifically, the present invention provides a print head that includes a filter disposed between an ink reservoir and a standpipe, the filter being configured to filter out an unwanted substance before ink from the ink reservoir enters the standpipe; and the standpipe configured to receive ink from the ink reservoir through the filter. Further, the standpipe includes an object disposed therein configured to impede gas bubble growth to facilitate flow of the received ink incident on the object through one or more passages in the object. Herein, an "unwanted substance" may include debris and particles produced during manufacturing and/or gas bubbles. Herein, "gas bubble growth" may refer to the growth of a gas bubble itself by incorporation of more gas extracted by means of rectified diffusion, and/or multiple gas bubbles within the standpipe 11 merging together to form a larger gas bubble.

Preferably, the filter corresponds to a mesh filter.

Preferably, the object is deformable.

Preferably, the object includes a mesh structure. In an embodiment, the mesh structure has a cylindrical or a conical shape. The mesh structure is formed by a rolled-up polygonal mesh sheet partially pinched at one end. Additionally, the mesh structure is made of a stainless-steel material. In an embodiment, a mesh size of the mesh structure is greater than a mesh size of the filter. The one or more passages include one or more meshes in the object. The one or more passages may additionally or alternately, include one or more spaces between contiguous loops in the object.

Preferably, the object includes a porous structure that has a parallelepiped shape. In an embodiment, the porous structure includes a porous cell foam material.

Preferably, the standpipe is attached to an aperture, which is configured to receive the ink that has flowed through the object, and further wherein the aperture is configured to facilitate flow of the received ink to a microfluidic device externally attached to the print head.

Preferably, the microfluidic device includes one or more ejection nozzles to eject one or more ink droplets when the microfluidic device is electrically activated through one or more electrical contact pads.

According to embodiments of the present invention, the ink incident on the object flows through the object through one or more passages in the object, and any gas bubbles that are present in the standpipe are trapped by the object and remain in place, such that gas bubble growth within the standpipe is impeded. Therefore, embodiments presented herein reduces the likelihood of an early clogging of ink in the standpipe during a natural life of the print head.

BRIEF DESCRIPTION OF THE DRAWINGS

Non-restrictive and non-exhaustive embodiments of the present invention will be described by examples referring to the drawings below, wherein:

FIG. 3, b) illustrates a cross-sectional exploded view of the print head, according to an embodiment.

FIG. 5, b) illustrates a schematic diagram of a standpipe including a larger gas bubble FIG. 6, a) illustrates a mesh sheet, in accordance with an embodiment.

DETAILED DESCRIPTION OF THE EMBODIMENTS

In order to make the above and other features and advantages of the invention clearer, the invention is further described in combination with the attached drawings below.

It is to be understood that the specific embodiments of the present invention are illustrative and not intended to be restrictive.

Figure 1:
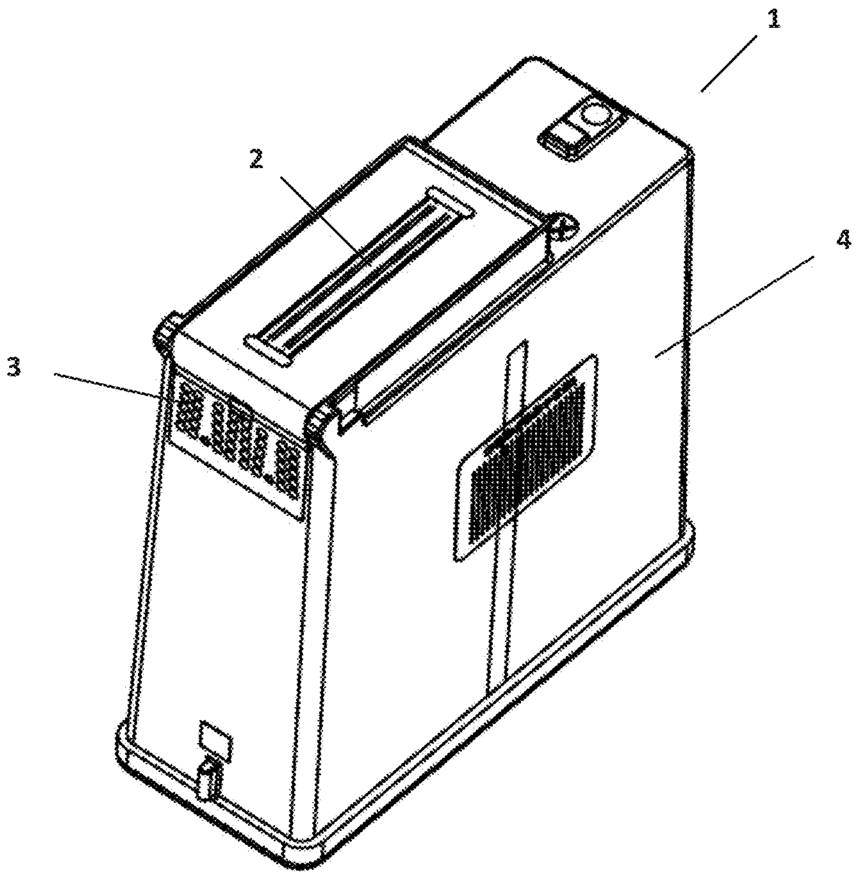
FIG. 1 illustrates a perspective schematic diagram of a print head of an ink jet printer, as known in the art.

FIG. 1 illustrates a perspective schematic diagram of a print head 1 of an ink-jet printer (not shown), as known in the art. As illustrated in FIG. 1, the print head 1 may include a body 4 to enclose inner components of the print head 1 from external factors such as shocks, vibrations, and environmental pollutants. In one example, the body 4 may be made up of plastic or any other suitable material that sufficiently protects the body 4 against external factors. Further, a microfluidic device 2 is externally attached to the body 4 via a suitable adhesive such as, but not limited to, a sealing glue or other adhesives known in the art. The sealing glue may provide mechanical strength and hermeticity to a joint between the microfluidic device 2 and the body 4 of the print head 1. Here, the microfluidic device 2 may be in fluidic connection with an ink reservoir (not shown in FIG. 1) included in the print head 1. In one example, the microfluidic device 2 may therefore, be connected to the ink reservoir via a standpipe and a mesh filter, as described later.

In an embodiment, the microfluidic device 2 may be configured to be electrically activated through one or more electrical contact pads 3 attached to the body 4. This aspect is described in more detail in the context of FIG. 2.

Figure 2:
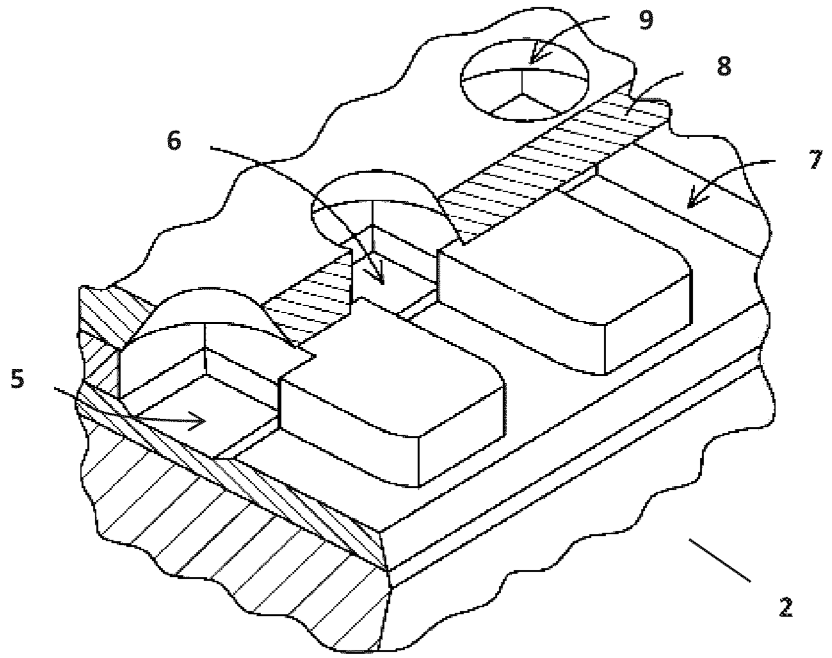
FIG. 2 illustrates a cross-sectional view of a microfluidic device attached to the print head, as known in the art.

FIG. 2 illustrates a cross-sectional view of the microfluidic device 2 attached to the print head 1. As illustrated in FIG. 2, the microfluidic device 2, may include a plurality of resistors 5. Each of the plurality of resistors 5 is in correspondence with a plurality of ejection chambers 6, which may be included in a fluidic circuit 7. Further, a nozzle plate 8 may be installed at the top of the microfluidic device 2. The nozzle plate 8 may include one or more ejection nozzles 9 for each of the plurality of ejection chambers 6. The ejection nozzles 9 may facilitate the ejection of ink from the print head 1, as will be described later.

In an embodiment, a sudden current pulse may be applied on-demand through a resistor 5, which is included in a substantially thin film. This electrical activation may cause a rapid vaporization of a thin layer of ink available below the ejection chambers 6. In an embodiment, the sudden current pulse through the resistor 5 may cause a rapid increase of the temperature in the resistor 5 because of Joule effect, which is known in the art. Therefore, heat flow may occur from the resistor 5 to the ink, through a thin dielectric layer of the thin film, in between the resistor 5 and the ink. In this embodiment, the resistor 5 must be electrically insulated from the ink. Therefore, the resistor 5 is covered by a thin dielectric layer, which is sufficiently thin to allow an appreciable heat flow towards the ink in order to implement this embodiment. A layer of ink closest to the resistor 5 (i.e., the layer of ink that is in contact with the thin dielectric film) is suddenly superheated by the ink flow and turns into vapor, whose pressure is of the order of tens of bars, in an example. A high value of vapor pressure may further cause the expansion of the vapor bubble, which may pull the ink above out of the ejection nozzles 9, thereby, producing the ejection of an ink droplet through the ejection nozzles 9. Once the ink is ejected, new ink is recalled from the ink reservoir to refill the ejection nozzles 9 again.

Figure 3:
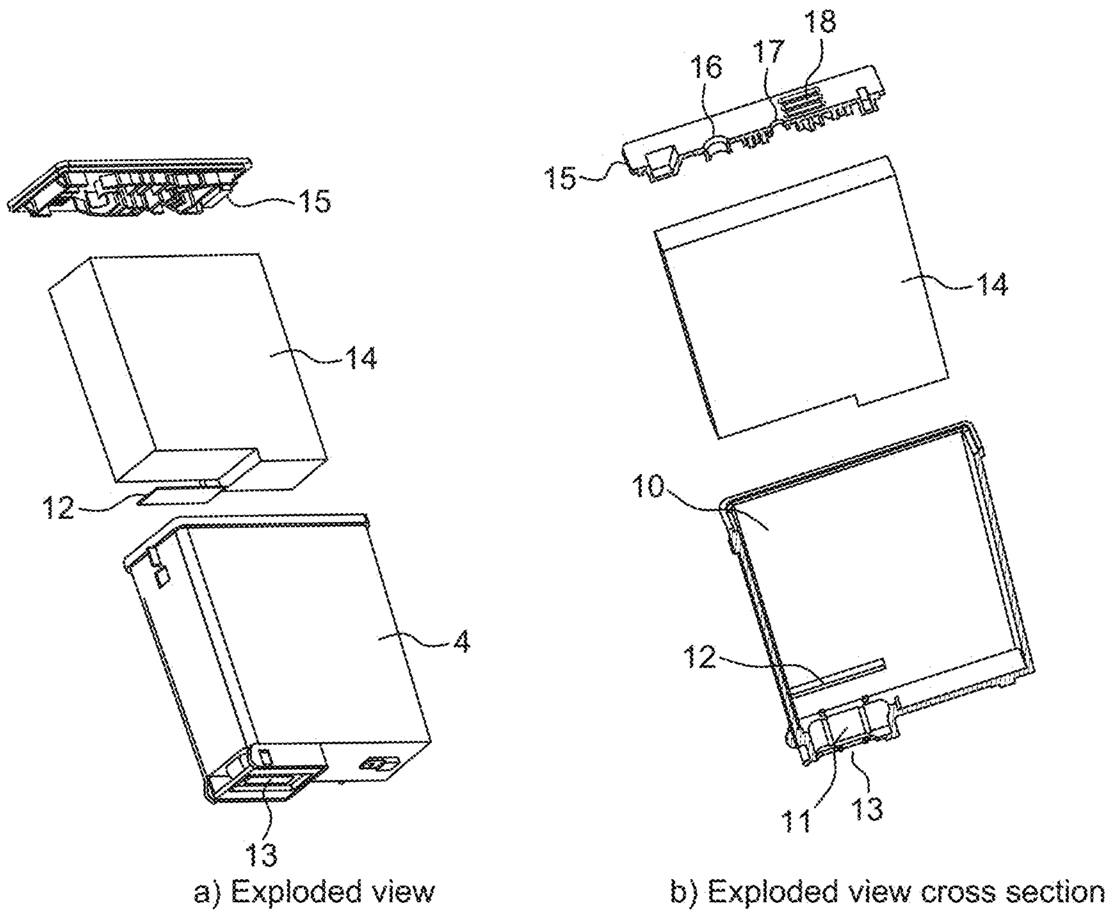
FIG. 3, a) illustrates an exploded view of the print head, according to an embodiment.

FIG. 3, a) illustrates an exploded view of the print head 1, in accordance with an embodiment. As illustrated in FIG. 3, a), the body 4 of the print head 1 may include a capillary porous member 14. In one embodiment, the capillary porous member 14 may be a porous material to create negative pressure within an ink reservoir (shown in FIG. 3, b)) of the print head 1. The ink flow through the ejection nozzles 9 must be accurately controlled, because it is one of the essential prerequisites for achieving high-end quality prints with an ink-jet printer. The capillary porous member 14 may assist in providing this control of the ink flow by acting as a backpressure system, which may create a slightly negative pressure within the ink reservoir. This negative pressure extends through the ink up to the ejection chambers 6. The negative pressure may be produced by a capillary effect of a network of pores of the capillary porous member 14. In one example, the porous material may an open-cell foam, a fibrous member or a combination of two or more elements, as known in the art. The negative pressure in the ink reservoir prevents any unintentional leakage of ink. Otherwise, such a leakage may occur when the print head 1 using the ink is idle or the ink reservoir is exposed to sudden accelerations, during handling of the print head 1.

Further, the body 4 of the print head 1 may be enclosed atop by a body lid 15. Additionally, the body 4 may also include an ink flow aperture 13 at the bottom of the body 4 to facilitate the ink flow towards the microfluidic device 2. The body 4 of the print head 1 also includes a mesh filter 12, which is described in the context of FIG. 3, b).

FIG. 3, b) illustrates a cross-sectional exploded view of the print head 1, in accordance with an embodiment. As illustrated in FIG. 3, b), the body lid 15 may be provided with an ink filling hole 16, through which a needle may penetrate across the capillary porous member 14, to fill an ink reservoir 10 (housed in body 4) with ink. In order to provide suitable communication with external atmospheric pressure, the body lid 15 may include an additional venting hole 17, with a smaller diameter compared to that of the ink filling hole 16. The venting hole 17 may be made in the body lid 15 at one end of a shallow serpentine venting channel 18, which is molded in a surface of the body lid 15.

Further, the standpipe 11 may be topped with the mesh filter 12 at a boundary with the ink reservoir 10 and may terminate at the other end with ink flow aperture 13 at the opposite end of the mesh filter 12. The ink flow aperture 13 allows the ink flow from the ink reservoir 10 towards the microfluidic device 2 externally attached to the standpipe 11, where the ink is fed to the ejection chambers 6. In one example, the standpipe may be a tubular structure positioned between the mesh filter 12 and the aperture 13. The aperture 13 may be located at an end portion of the standpipe 11 and may be molded to the standpipe 11, in this example.

Figure 4:
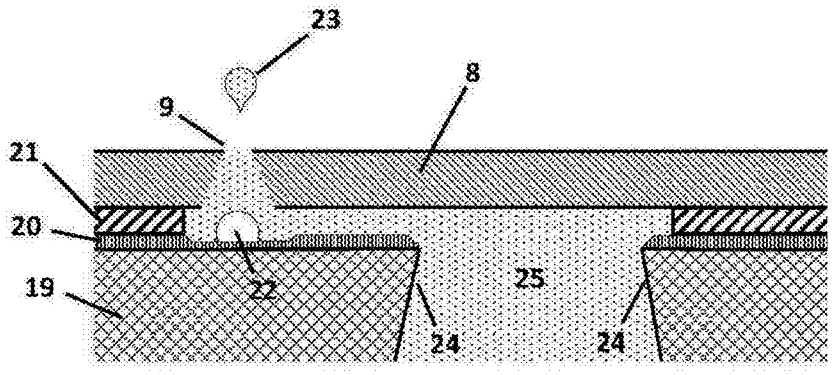
FIG. 4 illustrates a cross section view of a silicon chip included in the print head, according to an embodiment.

FIG. 4 illustrates a cross section view of a silicon chip 19 included in the microfluidic device 2, according to an embodiment. On the surface of a silicon chip 19, a layer stack 20 may be disposed. The layer stack 20 may include suitable conductors, resistors (e.g. resistors 5), and dielectric layers, which are realized with thin film technology, as known in the art. Onto the layer stack 20, the fluidic circuit 7 is realized through a suitably patterned polymer, which may also be referred to as barrier layer 21. The barrier layer 21 may be closed atop by the nozzle plate 8, where the ejection nozzle 9 is realized. In an embodiment, the vapor bubble 22 may be formed by applying a current pulse sent through the resistor 5. The expansion of the vapor bubble 22 may cause the ejection of an ink droplet 23 from an ejection nozzle 9. Further, a through-slot 24 may be put in communication the fluidic circuit 7 with the ink reservoir 10 via an ink flow aperture 13 of the body 4. Therefore, the ink 25 flows from the ink reservoir 10 through the mesh filter 12, the standpipe 11, the ink flow aperture 13, the through-slot 24, and subsequently, arrives at the ejection chamber 6.

Figure 5:
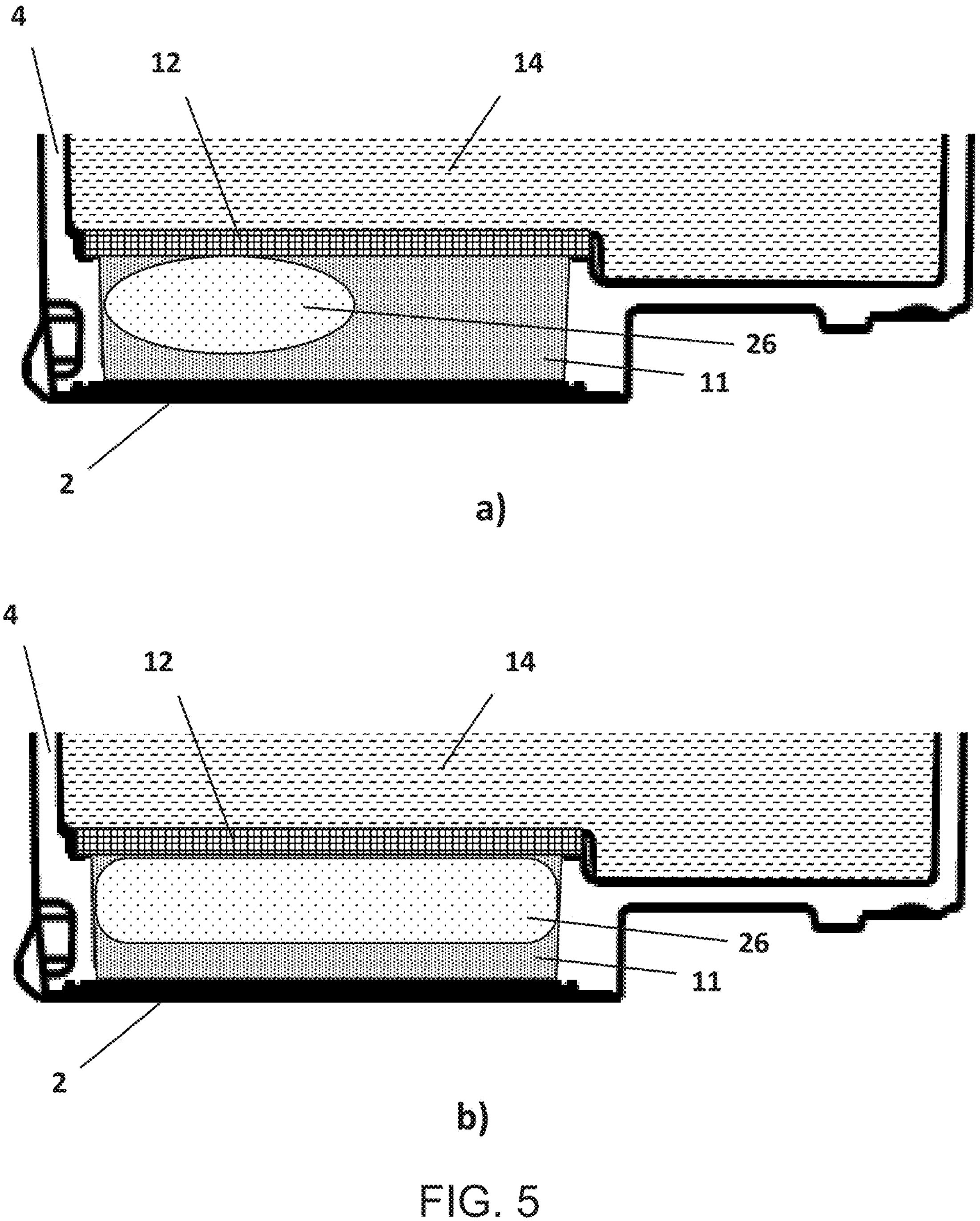
FIG. 5, a) illustrates a schematic diagram of a standpipe including a gas bubble, according to an embodiment.

FIG. 5, a) illustrates a schematic diagram of a standpipe 11 including a gas bubble 26, according to an embodiment.

During the vaporization of the ink 25, the atmospheric gases dissolved into the ink 25 may be partially released because of the increase in temperature, which lowers the solubility of the gases in the ink 25. Not only the gas dissolved in the vaporized layer, but also part of the gas included in the surrounding ink may be released because of the heat transfer during the vapor bubble generation phase. When the ink 25 is heavily saturated, there may be a large amount of gases released during the ink heating and vaporization.

In one example, a part of the released gas may be ejected with the ink during printing, but some gas may still remain in the print head 1, in the ejection chambers 6, or in the standpipe 11. Since the reabsorption of the released gas from the ink 25 is slower than its desorption, the released gas may dwell within the print head 1 for some time as a gas bubble 26. if a size of the gas bubble 26 is substantially small in size, a surface tension may prevail over the gas bubble 26. Therefore, the gas bubble 26 may shrink until the gas is reabsorbed by the ink 25 and the gas bubble 26 itself disappears. On the contrary, when the gas bubble 26 is sufficiently large, it may sustain its presence within the ink 25 and move through it over time, in the standpipe 11.

Until the size of the gas bubble 26 allows it to move within the standpipe 11, there may always be side passageways available for the ink to move towards the nozzles, without compromising the printing quality, as shown in FIG. 5, a).

On the other hand, as illustrated in FIG. 5, b), if the size of the gas bubble 26 is sufficiently large that it blocks the standpipe 11, the ink 25 may not flow from the ink reservoir 10 to the ejection nozzles 9. This situation causes clogging of the print head 1, especially when a strong ink flow is required for high density printing. In this situation, only a strong difference of pressure applied externally between the ink reservoir 10 and the ejection chambers 6 may push away the gas bubble and recover the functionality of the print head 1. This is a severe challenge for the reliability of a thermal print head, which would stop printing even if there is still sufficient ink inside the ink reservoir 10. This issue may happen even more frequently when the size of the standpipe 11 is small, as in the color print heads, where multiple reservoirs are embedded in a same ink cartridge.

In the above-described scenario, a first possible effect of the gas bubble 26 is the disturbance of the regular vaporization of the ink 25 during ejection. When the gas bubble 26 is near the resistor 5 of the print head 1, it can locally anticipate the vapor nucleation, preventing the delivered thermal energy from diffusing uniformly throughout the overlying ink. The generation of the vapor bubble 22 of the ink 25 turns out to be imperfect and the ejected ink drop 23 may lack kinetic energy and directionality. Even if a gas bubble 26 may be expelled during one of the subsequent printing shots, new gas can be released, causing a disturbance in the print head functionality.

A second effect of the presence of a gas bubble 26 is the growth of the gas bubble 26 itself, which can incorporate more gas extracted by the ink by means of a so-called rectified diffusion. Rectified diffusion is a bubble growth phenomenon that occurs in acoustic fields. When subjected to an oscillating pressure wave, a gas bubble of a suitable size range undergoes expansion and compression. Such oscillating pressure waves are very common in a thermal print head since the ink vaporization causes a pressure stroke of tens of bars in the surrounding ink. Whilst at the maximum of the gas bubble expansion, the inner pressure of the gas bubble is below the atmospheric pressure. During this oscillation, the pressure within the gas bubble decreases as it expands and increases as it compresses. Consequently, gas diffuses in and out of the gas bubble due to the differences in pressure between the interior and exterior of the gas bubble. Several effects contribute to an unequal diffusion in and out of the gas bubble and consequently, the size of the gas bubble increases. Moreover, due to fluctuations in the environmental pressure and temperature and also to the slow evaporation of the ink solvent, the gas bubbles tend often to grow spontaneously in the long term.

Further, multiple gas bubbles may migrate into the standpipe 11 and merge together to form a larger gas bubble 26. Such gas bubbles tend to concentrate in the standpipe 11, especially when the print head is positioned upright in the printer, with the nozzles facing down. These gas bubbles may move naturally upwards into the standing pipe 11, until they hit the mesh filter 12 on the top of the standpipe 11. The mesh filter 12 is difficult to be overcome by the gas bubble 26, due to the strong capillary pressure that would be exerted by the fine mesh of the mesh filter 12. Therefore, the large gas bubble 26 that is formed, tends to dwell in the standpipe 11 and grows over time.

Figure 6:
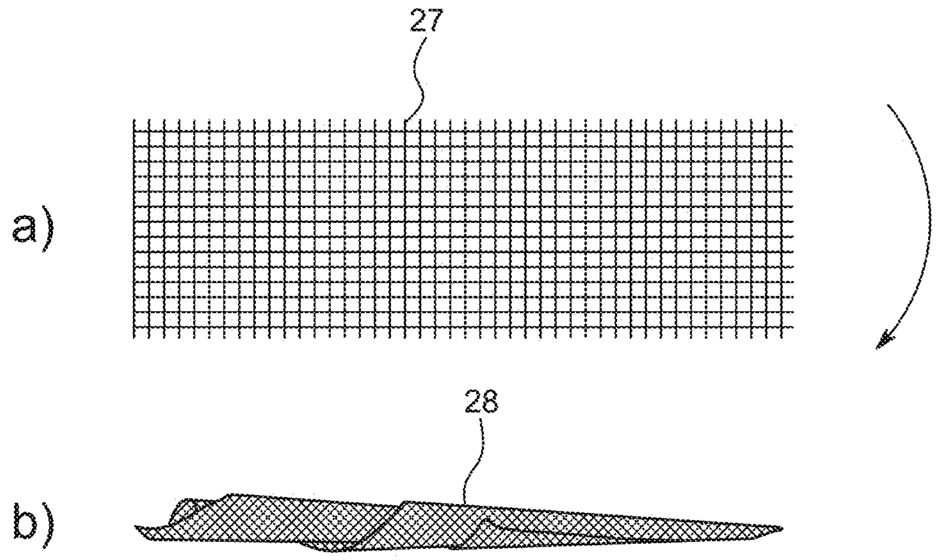
FIG. 6, b) illustrates an object made of the mesh sheet that can be disposed in the print head to prevent clogging in the print head, in accordance with an embodiment.

FIG. 6, a) illustrates a mesh sheet 27, in accordance with an embodiment. In one example, the mesh sheet 27 may be made up of stainless-steel or any other suitable material that is deformable. In one example, the mesh sheet 27 may have a polygonal or any other suitable shape that can be rolled-up to form a cylindrical or a conical mesh structure. In an embodiment, the polygonal mesh sheet 27 may be rolled-up to form a mesh structure and partial pinched at one end to form the object 28 as an insert disposed in the print head 1 for reducing or preventing clogging in the print head. This aspect is described in more detail in the context of FIG. 6, b).

FIG. 6, b) illustrates an object 28 that can be disposed in the print head 1, in accordance with an embodiment. In one example, the mesh sheet 27 illustrated in FIG. 6, a) may be rolled-up to form a cylindrical or a conical shaped mesh structure. In one example, the mesh structure may be partially pinched or crushed at one end to form the object 28 with a permanent forming, in accordance with an embodiment.

In one example, the object 28 may be made of stainless steel and may have a certain elasticity. However, if the object 28 is rolled, it may retain a permanent deformation, which could be rendered more stable by pinching the object 28 at one end. For instance, if the object 28 is pinched at one end, the shape of the object 28 may become "conical" instead of cylindrical. The object 28 may be pinched and/or rolled by a suitable industrial device, as known in the art.

Figure 7:
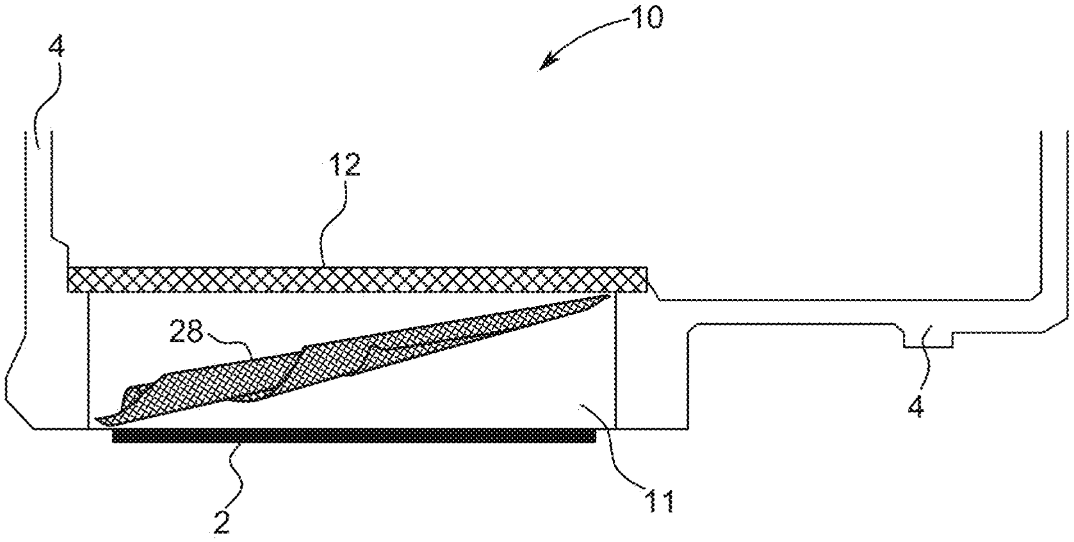
FIG. 7 illustrates a print head including the object, in accordance with an embodiment.

FIG. 7 illustrates the object 28 that may be disposed in the standpipe 11 of the print head 1 in a manner such that the object 28 provides several passages (e.g. mesh holes) through which the ink 25 incident on the object 28 may flow, such that the presence of the object 28 impedes the growth of a gas bubble within the standpipe 11 or otherwise prevents any gas bubbles trapped within the standpipe 11 from increasing in size or multiple gas bubbles from merging into a larger bubble. This may imply that the ink 25 may pass through one or more passages in the object 28 because of the mesh structure of the object 28. In an embodiment, the object 28 may provide multiple passages for the flow of ink through the object 28. For instance, one example of such passages may include a flow path created by one or more meshes in the mesh structure of the object 28. Further, since the mesh sheet is rolled-up, one or more narrow spaces between contiguous loops of the object 28 may act as a second flow path to provide additional passages to the flow of ink.

Further, the object 28 may be closed at the top by the mesh filter 12 attached to the body 4 of the print head 1. Therefore, embodiments presented herein reduce or prevent obstruction to ink flow because the presence of the object 28 impedes gas bubble growth. In one example, the object 28 may be inserted in an oblique manner in the standpipe 11, as illustrated in this figure. In this example, the object 28 may be in physical contact with the mesh filter 12. In another example, however, the object 28 may be inserted in the standpipe 11 in a manner such that the object 28 is not in physical contact with the mesh filter 12.

In an embodiment, the object 28 may have a greater mesh size as compared to a mesh size of the mesh filter 12. Therefore, even if large gas bubbles are present in the standpipe 11, the ink is able to find suitable passages either across the object 28 or between the object 28 and the inner walls of the standpipe. This may ensure a regular flow of the ink 25 even in scenarios where the standpipe 11 is occupied by the gas bubbles. In accordance with the embodiments presented herein, the object has a mesh structure. The mesh structure of the object 28 and its wrapped surface may be able to create spaces with high levels of energy threshold for a gas bubble to penetrate in the spaces and through the object 28. Therefore, the embodiments presented herein ensure that one or more passages always exist for flow of ink within or at a side of the object 28 to provide a continuous ink flow.

Figure 8:
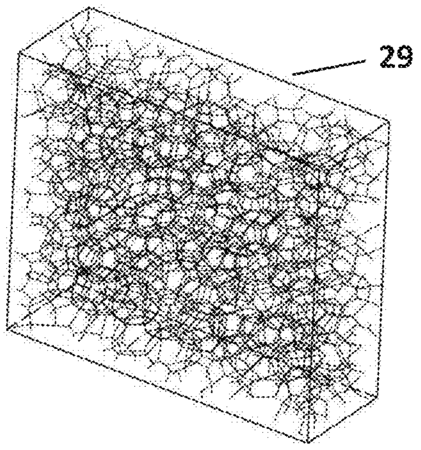
FIG. 8 illustrates an open cell foam, in accordance with embodiment.

FIG. 8 illustrates an open cell foam 29, in accordance with embodiment. In one example, the open cell foam 29 may be a parallelepiped-shaped structure having several pores to allow permeability of liquids (e.g. ink) to flow through the pores.

Figure 9:
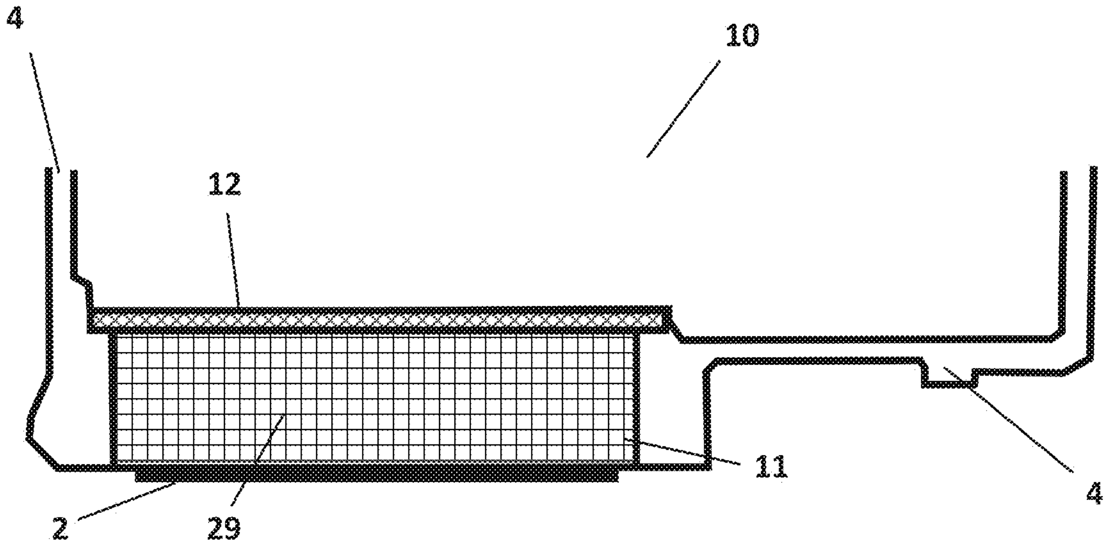
FIG. 9 illustrates a porous object that can be disposed in the print head to prevent clogging in the print head, in accordance with an embodiment.

FIG. 9 illustrates a porous object 29 that can be disposed in the standpipe 11 of the print head 1 to reduce or prevent clogging, in accordance with an embodiment. In one example, the porous object 29 may be the open cell foam 29 or a fiber-based material that has a porous structure. The porous object 29 may, thus, create a plurality of communicating spaces with a substantially high level of energy threshold for a gas bubble to penetrate such that gas bubble growth is impeded, so as to facilitate the establishment of ink passages from the ink reservoir 10 to the ejection nozzles 9. As illustrated in FIG. 9, the porous object 29, being deformable, may be conveniently inserted into the standpipe 11 to maintain a continuous ink flow. In another example, instead of the open cell foam, the object 29 may include a stainless "steel wool" to achieve a similar functionality, as described above.

In accordance with the embodiments presented herein, the objects 28 and 29, when inserted into the standpipe 11 maintain continuous flow of ink that is incident on these objects. The passages (mesh holes or pores) provided in the objects 28 and 29 ensure the continuous flow of ink by impeding gas bubble growth within the standpipe 11, which reduces or prevents clogging of ink in the standpipe 11. Therefore, the embodiments presented herein enable the print head 1 to work throughout its natural life by reducing the likelihood of or preventing early clogging. Further, all the embodiments can be implemented in production minor adjustments in the manufacturing process flow and represent a cost-effective improvement to the print head reliability.

Various technical features described above may be combined arbitrarily. Although not all of possible combinations of various technical features are described, but all the combinations of these technical features should be regarded as within the scope described in the present specification provided that they do not conflict.

Notwithstanding the description of the invention in combination with embodiments, those skilled in the art shall understand that the above description and drawings are only illustrative and not restrictive, and the invention is not limited to the embodiments disclosed. Various modifications and variations are possible without departing from the concept of the invention.

LIST OF DESIGNATIONS

- 1—Print head
- 2—Microfluidic device
- 3—Electrical contact pads
- 4—Body of print head
- 5—Resistor(s)
- 6—Ejection chamber(s)
- 7—Fluidic circuit
- 8—Nozzle plate
- 9—Ejection nozzle(s)
- 10—Ink reservoir
- 11—Standpipe
- 12—Mesh filter
- 13—Ink flow aperture
- 14—Capillary porous member
- 15—Body lid of print head
- 16—Ink filling hole
- 17—Venting hole
- 18—Serpentine venting channel
- 19—Silicon chip
- 20—Layer stack
- 21—Barrier layer
- 22—Vapor bubble
- 23—Ink droplet
- 24—Through-slot
- 25—Ink
- 26—Gas bubble in the standpipe
- 27—Mesh sheet
- 28—Object formed by rolled-up mesh sheet (Bubble stopper insert)
- 29—Object formed by porous cell foam material (Bubble stopper insert)

What is claimed is:

1. A print head comprising:

a filter disposed between an ink reservoir and a standpipe, the filter being configured to filter out an unwanted substance before ink from the ink reservoir enters the standpipe; and the standpipe configured to receive ink from the ink reservoir through the filter;

wherein the standpipe comprises an object disposed therein configured to impede gas bubble growth to facilitate flow of the received ink incident on the object through one or more passages in the object, wherein the object comprises a mesh structure and further wherein the mesh structure has a cylindrical or a conical shape.

2. The print head according to claim 1, wherein the filter corresponds to a mesh filter.

3. The print head according to claim 1, wherein the object is deformable.

4. The print head according to claim 1, wherein t 1, wherein the mesh structure is formed by a rolled-up polygonal mesh sheet partially pinched at one end.

5. The print head according to claim 1, wherein the mesh structure is comprised of a stainless-steel material.

6. The print head according to claim 1, wherein a mesh size of the mesh structure is greater than a mesh size of the filter.

7. The print head according to claim 1, wherein the standpipe is attached to an aperture, which is configured to receive the ink that has flowed through the object, and further wherein the aperture is configured to facilitate flow of the received ink to a microfluidic device externally attached to the print head.

8. The print head according to claim 7, wherein the microfluidic device comprises one or more ejection nozzles to eject one or more ink droplets when the microfluidic device is electrically activated through one or more electrical contact pads.

9. The print head according to claim 1, wherein the one or more passages comprise one or more meshes in the object.

10. The print head according to claim 1, wherein the one or more passages comprise one or more spaces between contiguous loops of the object.

11. A standpipe for a print head, the standpipe configured to receive ink through a filter disposed between an ink reservoir and the standpipe and comprising an object disposed therein configured to impede gas bubble growth in such a manner that an inflow of the received ink incident on the object flows through one or more passages in the object, wherein the object comprises a mesh structure and further wherein the mesh structure has a cylindrical or a conical shape.

* * * * *